US009729310B2

(12) United States Patent
Hars et al.

(10) Patent No.: US 9,729,310 B2
(45) Date of Patent: Aug. 8, 2017

(54) SCRAMBLED COUNTER MODE FOR DIFFERENTIAL POWER ANALYSIS RESISTANT ENCRYPTION

(71) Applicant: The Boeing Company, Chicago, IL (US)

(72) Inventors: Laszlo Hars, Lafayette, CO (US); Donald P. Matthews, Jr., Longmont, CO (US)

(73) Assignee: The Boeing Company, Chicago, IL (US)

( * ) Notice: Subject to any disclaimer, the term of this patent is extended or adjusted under 35 U.S.C. 154(b) by 43 days.

(21) Appl. No.: 14/878,258

(22) Filed: Oct. 8, 2015

(65) Prior Publication Data

US 2017/0104581 A1 Apr. 13, 2017

(51) Int. Cl.
*H04L 29/06* (2006.01)
*H04L 9/00* (2006.01)
*H04L 9/06* (2006.01)

(52) U.S. Cl.
CPC ............ *H04L 9/003* (2013.01); *H04L 9/0618* (2013.01); *H04L 9/0625* (2013.01); *H04L 9/0631* (2013.01)

(58) Field of Classification Search
USPC ......................................................... 713/189
See application file for complete search history.

(56) References Cited

U.S. PATENT DOCUMENTS

| | | | | |
|---|---|---|---|---|
| 2012/0121083 A1* | 5/2012 | You | ........................ | H04L 9/0631 380/28 |
| 2013/0073850 A1* | 3/2013 | Zaverucha | ............ | H04L 9/0869 713/168 |
| 2015/0215116 A1* | 7/2015 | Gong | ..................... | H04B 10/85 380/256 |
| 2016/0080143 A1* | 3/2016 | Kindarji | ................ | H04L 9/0637 380/28 |

OTHER PUBLICATIONS

"The security and performance of the Galois/counter mode of operation" by David McGrew et al; 21 pages, 2004.*
U.S. Appl. No. 14/472,978, filed Aug. 29, 2014 to Hars.
U.S. Appl. No. 14/473,006, filed Aug. 29, 2014 to Hars.
(Continued)

*Primary Examiner* — Jason Lee
(74) *Attorney, Agent, or Firm* — Smith Moore Leatherwood LLP

(57) ABSTRACT

A system and method for providing a scrambled counter mode encryption for a device that mitigates the effect of side channel attacks based on differential power analysis (DPA). The scrambled counter mode encryption engine creates noise at the start of the encryption process by obfuscating the counter value with the use of the very fast mixing function, such as a mixing function based on a XOR tree, substitution-permutation networks, or double-mix Feistel networks. The mixing function uses some secret key material, which diversifies its behavior between different instantiations. Because the counter values are scrambled and the mixing functions operate very fast in parallel hardware, the input of the block cipher is pseudorandom and groups of blocks can't be correlated. The output of the block cipher is XORed with a plaintext message to obtain a cipher text message.

22 Claims, 7 Drawing Sheets

(56) References Cited

OTHER PUBLICATIONS

U.S. Appl. No. 14/473,042, filed Aug. 29, 2014 to Hars.
"Counter mode (CTR)," 2015, Wikipedia article—http://en.wikipedia.org/wiki/CTR_mode#CTR [Sep. 3, 2015], 14 pages, (see pp. 10-11).
"Output Feedback mode (OFB)," 2015, Wikipedia article—http://en.wikipedia.org/wiki/Output_feedback#OFB [Sep. 3, 2015], 14 pages, (see pp. 9-10).
"XTS encryption mode," 2015, Wikipedia article—http://en.wikipedia.org/wiki/XTS_mode#XEX-based_tweaked-codebook_mode_with_ciphertext_stealing_.28XTS.29 [May 11, 2015], 6 pages, (see pp. 3-4).
"SHA-2," 2015, Wikipedia article—http://en.wikipedia.org/wiki/SHA-2 [Oct. 7, 2015], 13 pages.
"Message authentication code," 2015, Wikipedia article—http://en.wikipedia.org/wiki/Message_authentication_code [Oct. 7, 2015], 4 pages.
European Search Report dated Feb. 27, 2017 in corresponding European Patent Application No. 1192588.8.
Zhang Liting et al: "PolyE+CTR: A Swiss-Army-Knife Mode for Block Ciphers", Oct. 16, 2011 (Oct. 16, 2011), Network and Parallel Computing; [Lecture Notes in Computer Science; Lect. Notes Computer], Springer International Publishing, Cham, pp. 26-280, XP047379228, ISSN: 0302-9743; ISBN: 978-3-642-289838-5, * section 3; figures 3, 4*.
McGrew, David A., "Counter Mode Security: Analysis and Recommendations," Nov. 15, 2002 (Nov. 15, 2002), XP055347424, Retrieved from the Internet: URL: http//cr.yp.to/bib/2002/mcgrew.pdf.

* cited by examiner

SCRAMBLED COUNTER MODE FOR DIFFERENTIAL POWER ANALYSIS RESISTANT ENCRYPTION

TECHNOLOGICAL FIELD

The present disclosure relates generally to data encryption modes and, in particular, to an improved system that uses mixing functions to scramble counter values in a stream cipher operating in counter mode to mitigate the effect of attacks based use of differential power analysis (DPA).

BACKGROUND

The aviation industry largely depends on the reliable functioning of critical information technology infrastructure. Like many other industries, the aviation industry is challenged with providing adequate security for such IT infrastructure and mitigating the effects of any cyber events. Examples of cyber events include malicious or suspicious events that compromise, or attempt to compromise, the operation of an aircraft's network, including its data connections, data transmission, and computing systems.

The secrecy and integrity of stored or transmitted data can generally be assured by cryptographic means when no adversary has physical access to the electronic devices processing the data. This is because during the operation of such devices, some information about secret keys or sensitive data always leaks in side channels, including variation of response times, fluctuation of power use, or ultrasonic or electromagnetic wave radiation. In order to optimize security, fast encryption modes with reduced side channel leakage are needed that do not significantly increase processing time, system complexity, the size of electronic circuits, or energy usage.

Standard Federal Information Processing Standards (FIPS)-approved counter encryption engines are stream ciphers that have simple structures. As shown in FIG. 1, the prior art counter encryption engine (hardware and/or software) 100 consists of a counter and a series of block ciphers 102. The counter is initialized by a "nonce," which means a number used once that practically never repeats. The nonce can be a sequence number, the current value of a real time clock, or a long enough random number such that the chance of repetition is negligible. The input of each block cipher 102 is based on the value of the counter. Each time a message block is processed by a block cipher 102, the counter value is incremented and encrypted with the same secret key that is used for all the block ciphers 102. The resulting stream is a sequence of the encrypted counter which is then XORed to the plaintext (the message that needs to be encrypted), to obtain the ciphertext (the encrypted message). Decryption of the plaintext message is exactly the opposite of the encryption process just described, wherein the stream of output blocks of the block cipher 102 is XORed to the ciphertext of the message. This cancels out the encryption operation, thereby leaving the plaintext message as the result.

In such prior art counter mode encryption engines 100, even if the counter is incremented by a large constant instead of 1, the low order bits exhibit very short cycles. Thus, while the encryption engine 100 is fully parallelizable, the simple generation of the input for each of the block ciphers 102 makes the engine 100 prone to certain side channel attacks, like attacks based on differential power analysis (DPA). DPA measures the changing power signals as the device processes and encrypts data. A DPA attack records power traces and groups them by the known input bits of the block cipher. For example, if an attacker can provide the plaintext message for the counter mode encryption engine 100, the attacker may XOR the plaintext to the ciphertext. The result is the sequence of the encrypted counter values, which provides an ideal scenario for a DPA attack.

Published proprietary algorithms for side channel leakage prevention are slow and consume a lot of energy, such as key rolling techniques. Thus, it is desirable to have an improved counter mode encryption system for mitigating side channel attacks.

BRIEF SUMMARY

In view of the foregoing background, example implementations of the present disclosure provide a system for a system for improving security of a device including a counter, a first mixing unit that scrambles a first value of the counter, and a first block cipher that encrypts the scrambled first value of the counter. The output of the first block cipher is XORed to a first plaintext message to obtain a first ciphertext message. The counter is initialized by a nonce, which can be sequence number, real-time clock value, or random number. The first mixing unit maps bit input of the nonce's block size with bit output of the nonce's block size, is invertible, and is nonlinear. The first mixing unit can be a XOR tree mixing unit, substitution-permutation mixing unit, or double-mix Feistel mixing unit. The first block cipher is a FIPS approved AES cipher. The system further includes a second mixing unit that scrambles a second value of the counter, and a second block cipher that encrypts the scrambled second value of the counter. The output of the second block cipher is XORed to a second plaintext message to obtain a second ciphertext message. The system is parallelizable such that the second ciphertext message can be generated without using the first ciphertext message. Also, an identical key can be used for first block cipher and the second block cipher. The scrambled first counter value has no statistical correlation with the scrambled second counter value.

In a further implementation of the present disclosure, a system is provided for improving the security of a device including a counter mode encryption engine that receives data, applies a block cipher operating in connection with a counter to a segment of the data, applies a mixing function to the counter of the block cipher, and processes remaining segments of the data with the block cipher while applying the mixing function to the counter for each segment of the data.

In yet a further implementation of the present disclosure, a method for of for improving the security of a device is provided that includes the steps of initializing a counter, scrambling a first value of the counter with a first mixing unit, encrypting the scrambled first value of the counter with a first block cipher, and XORing an output of the first block cipher to a first plaintext message to obtain a first ciphertext message. The method further includes the steps of scrambling a second value of the counter with a second mixing unit, encrypting the scrambled second value of the counter with a second block cipher, and XORing an output of the second block cipher to a second plaintext message to obtain a second ciphertext message.

The features, functions and advantages discussed herein may be achieved independently in various example implementations or may be combined in yet other example implementations, further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
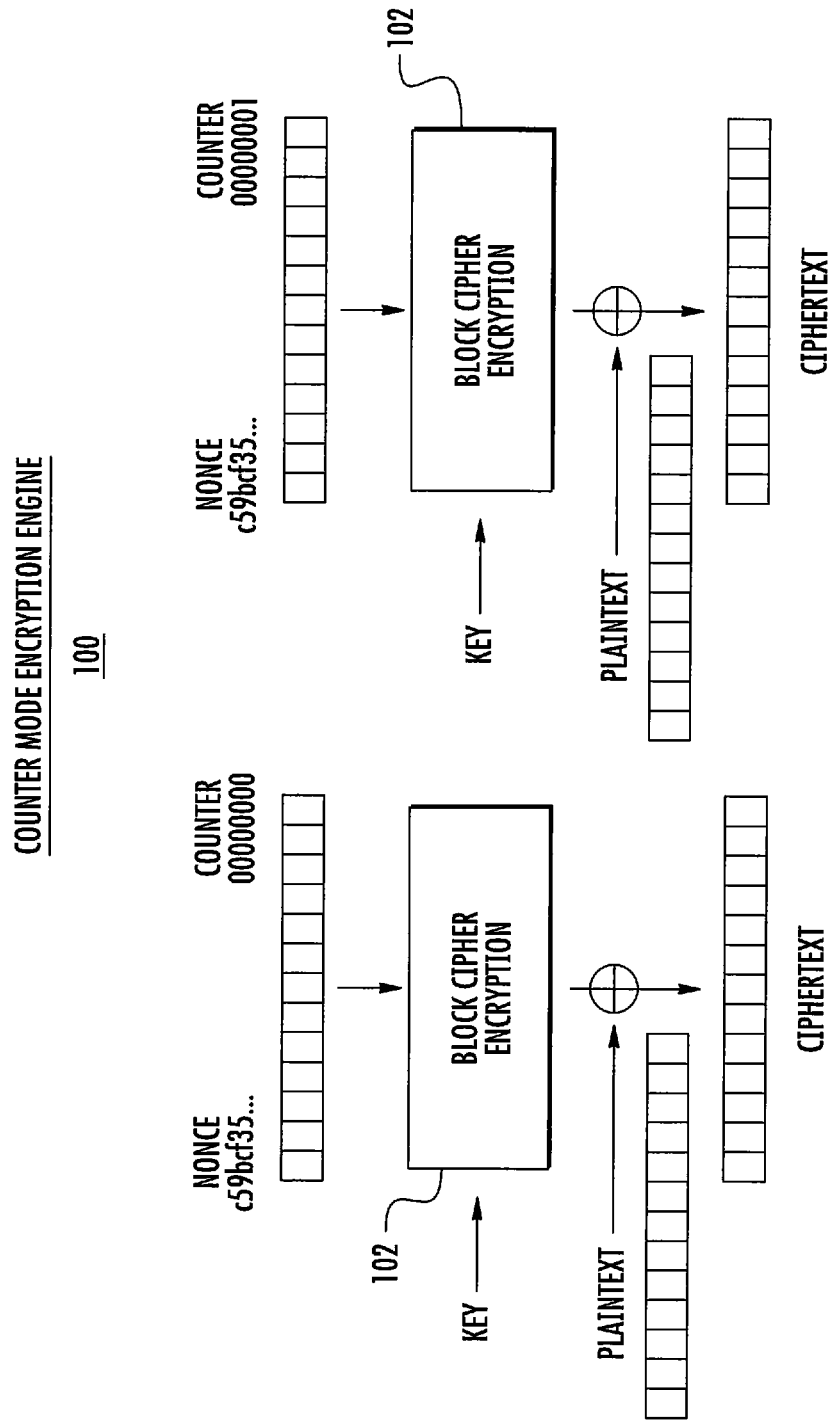
FIG. 1 is logic diagram of a prior art counter mode encryption engine.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure will be primarily described in conjunction with aviation applications. It should be understood, however, that example implementations may be utilized in conjunction with a variety of other applications, both in the aviation industry and outside of the aviation industry.

Figure 2:
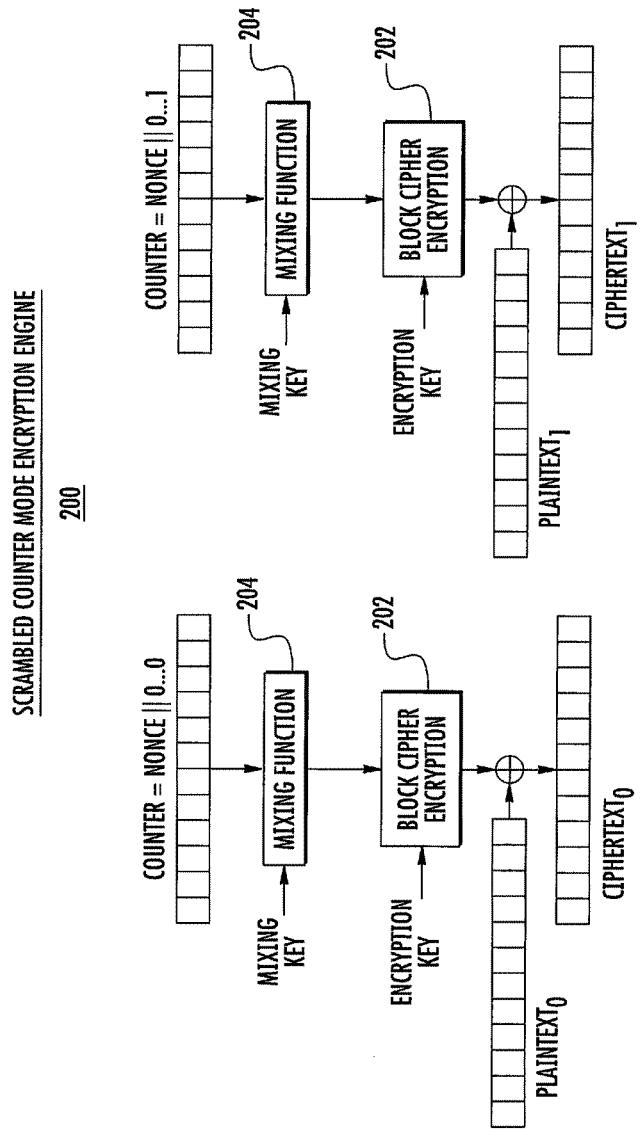
FIG. 2 is a logic diagram of a scrambled counter mode encryption engine in accordance with an example implementation of the present disclosure.

According to example implementations of the present disclosure, and as shown in FIG. 2, the present invention is a scrambled counter mode encryption engine 200 that functions as a stream cipher. Similar to the prior art counter mode encryption engine 100 described with respect to FIG. 1 above, the scrambled encryption engine (hardware and/or software) 200 consists of a counter and a series of block ciphers 202. The counter is initialized by a nonce, which, as described above, can be a sequence number, the current value of a real time clock, or a long enough random number such that the chance of repetition is negligible. The nonce is provided by the entity or user requesting the message encryption.

Unlike the prior art counter mode encryption engine 100, the improved scrambled counter mode encryption engine 200 incorporates the use of very fast and thorough mixing functions 204, referred to herein as MIX. The input of each block cipher 202 is either: (i) MIX (nonce||counter); or (ii) MIX (nonce⊕counter), wherein the symbol || denotes concatenation of the bit streams, and the ⊕ denotes a bitwise exclusive OR, also known as an XOR operation.

The mixing functions 204 are similar to block ciphers 202 but they are much faster. The mixing functions 204 are also less secure than the block ciphers 202 because some correlation may exist between their input and output, thereby making them generally unfit for encryption operations by themselves. However, when either the input or the output of a mixing function 204 is hidden from an attacker, the attacker cannot mount traditional cryptologic attacks or side-channel attacks, such as DPA-type attacks. Thus, the fast mixing functions 204 are ideal for cryptographic key generation, including secret keys producing other secret keys.

The mixing functions 204 used in the scrambled counter mode encryption engine 200 have the following properties:
1) They map n-bit input to n-bit output (n=block size).
2) The mixing depends on a large amount of secret key material, which can be generated from a single key and/or a random number generator.
3) The mixing function is bijection (invertible).
4) Every input bit influences every output bit in non-linear way.
5) Every nonempty set of input bits also influences every output bit (no effect cancels).

Figure 4:
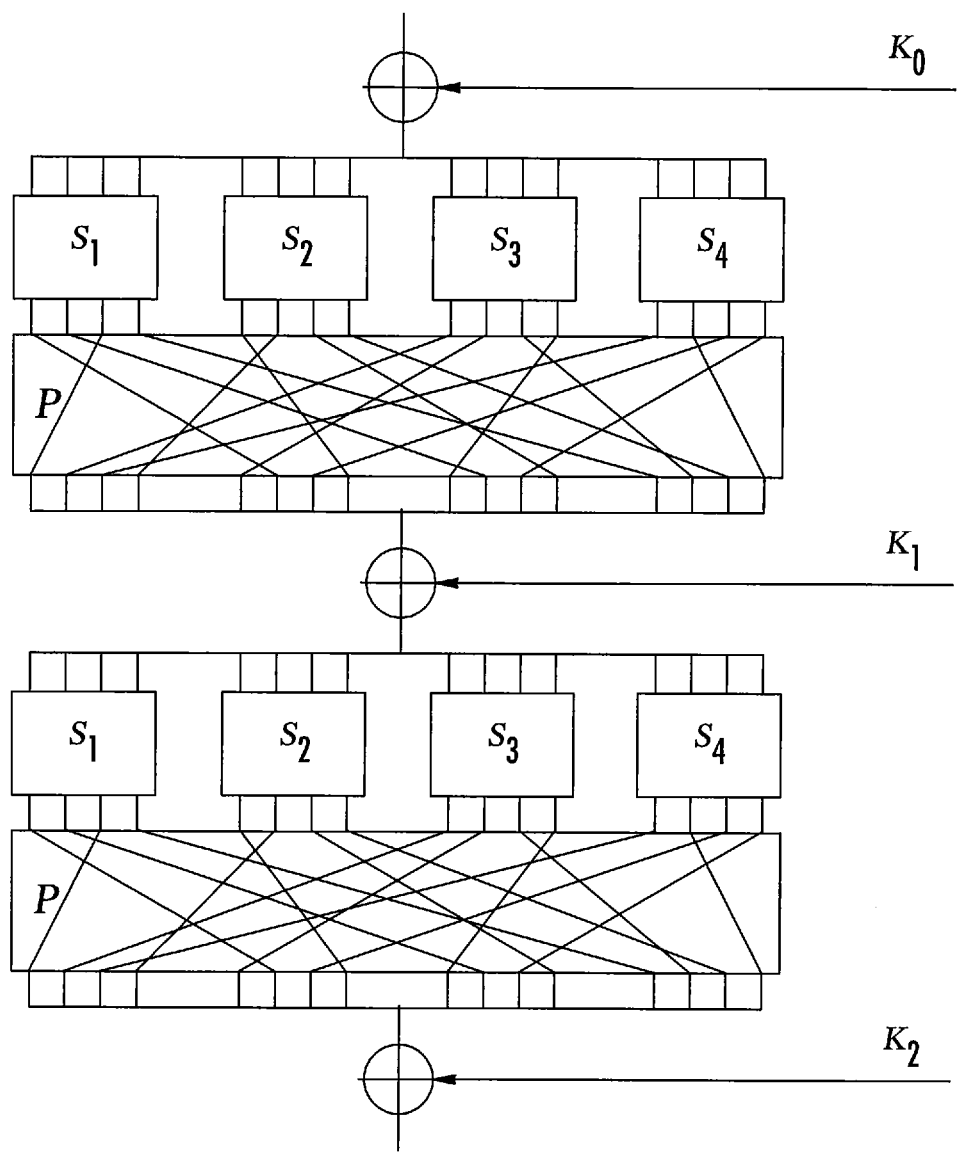
FIG. 4 is a logic diagram of a substitution-permutation network based key generator for a mixing function in accordance with an example implementation of the present disclosure.
Figure 5:
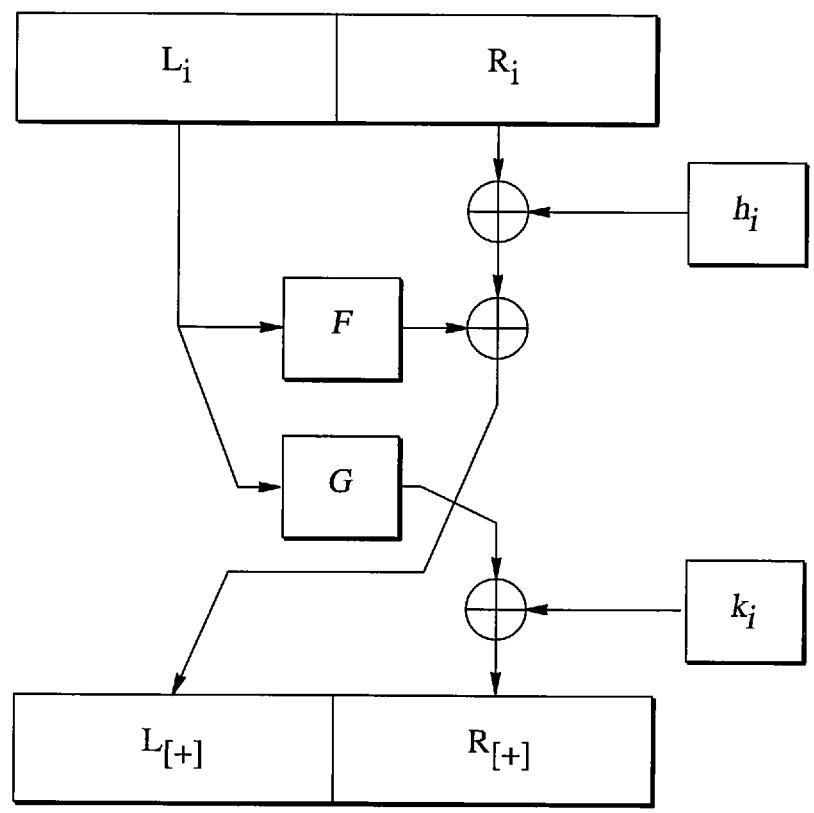
FIG. 5 is a logic diagram of a double-mix Feistel network based key generator for a mixing function in accordance with an example implementation of the present disclosure.

According to example implementations of the present disclosure, suitable mixing functions 204 for use in the scrambled counter mode encryption engine 200 are XOR trees (FIG. 3), substitution-permutation networks (FIG. 4), and double-mix Feistel networks (FIG. 5). The non-linearity of the mixing functions 204, as referenced above, may be provided by arithmetic additions of shifted data or S-Boxes, which can degenerate to (N)AND/OR gates (2×1 bit S-Boxes). These mixing functions 204 use secret key materials. When two input parameters are supplied, the second parameter replaces a part of the first mixing subkey.

Figure 3:
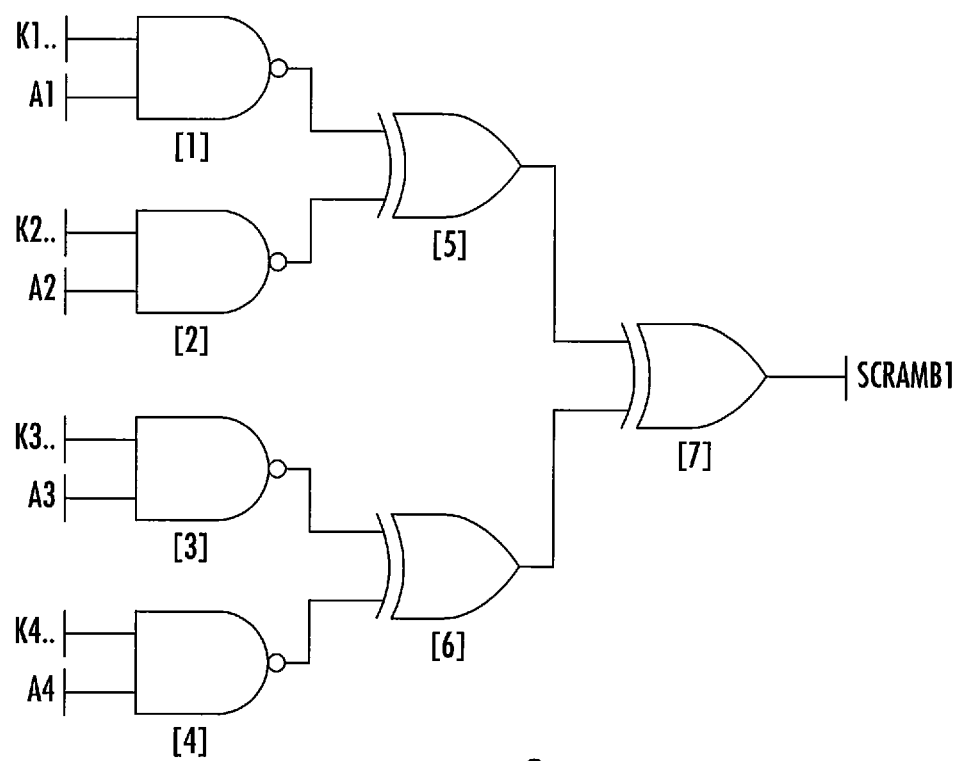
FIG. 3 is a logic diagram of a XOR tree based key generator for a mixing function in accordance with an example implementation of the present disclosure.

Referring now to FIG. 3 regarding the mixing function 204 using a XOR tree based key generator, the input bits A1, A2, A3 . . . select corresponding subkeys K1, K2, K3 . . . to XOR. The final scramble operation step makes the construction non-linear and can be comprised of rotate-add operations, or a series of nonlinear S-Box operations. The XOR tree based key generator may further include additional input selects, including rotated subkeys.

Referring now to FIG. 4 regarding the mixing function 204 using a substitution-permutation network based key generator, the input bits are fed in from the top of the logic diagram, and the output is taken from the bottom of the logic diagram. The subkeys $K_i$ are independent randomly created secrets. $S_1$, $S_2$ . . . are S-Boxes, which are small, non-linear substitution functions. The number of layers of the mixing network is chosen to be at least twice of the full mixing depth (when every input bit effects every output bit).

Referring now to FIG. 5 regarding the mixing function 204 using a double-mix Feistel network based key generator, F is a non-linear, very difficult (or impossible) to invert function, whereas G is invertible. In implementations with parallel operating electronic circuits, the mixing performance of the Feistel network is double that of a traditional Feistel network. $[L_0, R_0]$ is the input of the mixing function and the output is taken from the bottom of the logic diagram.

The number of layers of the mixing network is chosen to be as high as fits to a single clock-cycle requirement.

Referring again to FIG. 2, each time a message block is processed by a block cipher 202, the counter value is incremented, its bits are mixed together with the employed mixing function 204, and the result is encrypted with the same secret key that is used for all the block ciphers 202, even though using different keys is also possible. The resulting stream is a sequence of the encrypted, mixed counter values, which is then XORed to the plaintext (the message that needs to be encrypted), to obtain the ciphertext (the encrypted message). If the plaintext is longer than the number of available cipher blocks in the hardware, subsequent segments of the plaintext message are encrypted with previously used cipher blocks 202 with appropriately incremented input counter values. Decryption of the plaintext message is exactly the opposite of the encryption process just described, wherein the stream of output blocks of the block cipher 202 is XORed to the ciphertext of the message. This cancels out the encryption operation, thereby leaving the plaintext message as the result.

The scrambled counter encryption engine 200 as described herein functions as a stream cipher that includes the following elements:
1) The encryption is constructed from a secure block cipher 202 that is, for example the FIPS approved Advanced Encryption Standard (AES) cipher.
2) The encryption of long messages is parallelizable, meaning that: (a) any ciphertext block of a long message can be generated without using other ciphertext blocks; and (b) any auxiliary value (e.g. counter value) can be computed with a small amount of computational work.
3) The same key is used for many (or all) of the block ciphers 202 so the internal key schedule of the block cipher 202 can be cached or the block cipher 202 can be otherwise optimized.
4) The input of the block ciphers 202 is unknown to an attacker, which helps to thwart DPA attacks.
5) The input values of any two ciphers 202 is uncorrelated, which further helps to thwart DPA attacks.
6) Any auxiliary computation (e.g. scrambling of the counter) is very fast, such that no DPA-type attacks are feasible against the auxiliary computation.

The scrambled counter mode encryption engine 200 as described herein is very useful in situations where an attacker can observe side channel leakages from the encryption or decryption devices. This is because the scrambled counter mode encryption engine 200 creates noise at the start of the encryption process by obfuscating the counter value with the use of the very fast mixing function 204. The mixing function 204 uses some secret key material, which diversifies its behavior between different instantiations. Because the counter values are scrambled and the mixing functions 204 operate very fast in parallel hardware, the input of the block cipher 202 is pseudorandom (unknown to the attacker) and any groups of blocks can't be correlated. Therefore, there is no exploitable side channel leakage of the cipher 202, which renders DPA-type side channel attacks ineffective.

In addition to the scrambled counter mode encryption engine 200 improving the security of standard encryption modes, use of such scrambled counter mode encryption engine 200 is low cost and does not significantly increase circuit size, power usage, or processing time. Compared to known encryption systems with key rolling methods for protection from side channel analysis attacks, when the scrambled counter mode encryption engine 200 is used, the encryption or decryption speed and also the power consumption decreases about two fold. Therefore, slower electronic components can be used, which further reduce the energy consumption of the corresponding computing system without compromising security. Example computer systems include flight computers, military and space programs, corporate networks, personal and laptop computers, smart mobile devices, even secure communication networks.

According to example implementations of the present disclosure, the various components of the scrambled counter mode encryption engine 200 may be implemented by various means including hardware, alone or under direction of one or more computer program code instructions, program instructions or executable computer-readable program code instructions from a computer-readable storage medium.

In one example, one or more apparatuses may be provided that are configured to function as or otherwise implement the scrambled counter mode encryption engine 200 and respective elements shown and described herein. In examples involving more than one apparatus, the respective apparatuses may be connected to or otherwise in communication with one another in a number of different manners, such as directly or indirectly via a wireline or wireless network or the like.

Generally, an apparatus of exemplary implementation for the system 100 of the present disclosure may include one or more of a number of components such as a processor (e.g., processor unit) connected to a memory (e.g., storage device), as described above. The processor is generally any piece of hardware that is capable of processing information such as, for example, data, computer-readable program code, instructions or the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of scrambled counter mode encryption engine 200. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Figure 6:
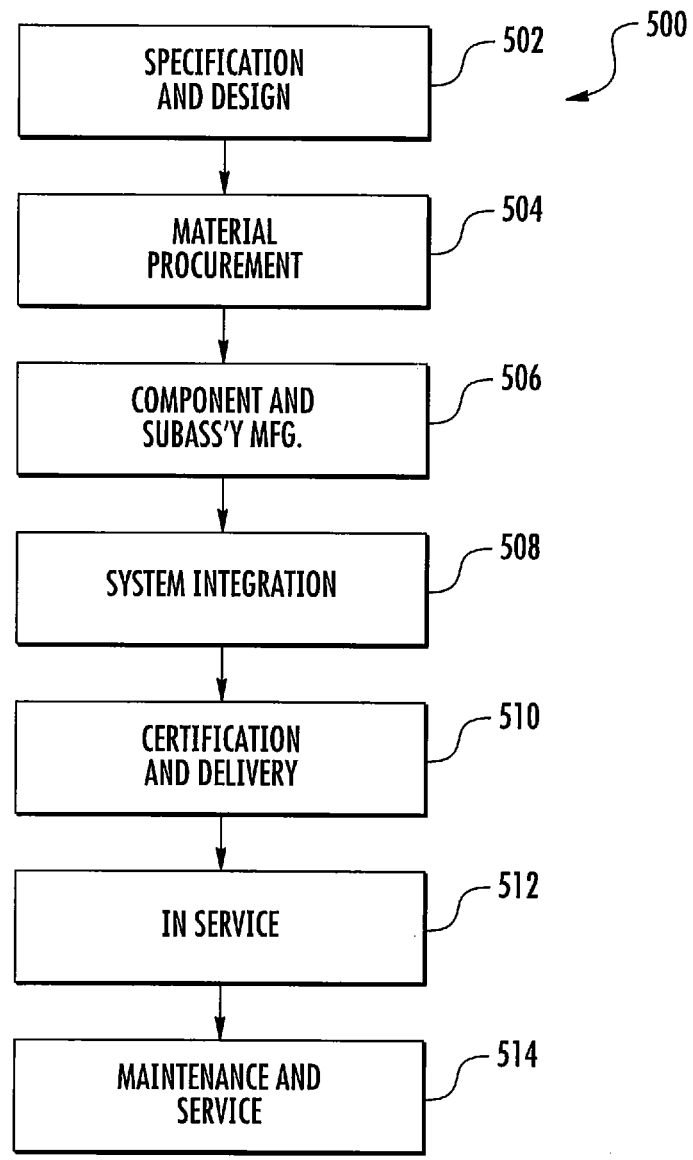
FIG. 6 is a block diagram of aircraft production and service methodology.
Figure 7:
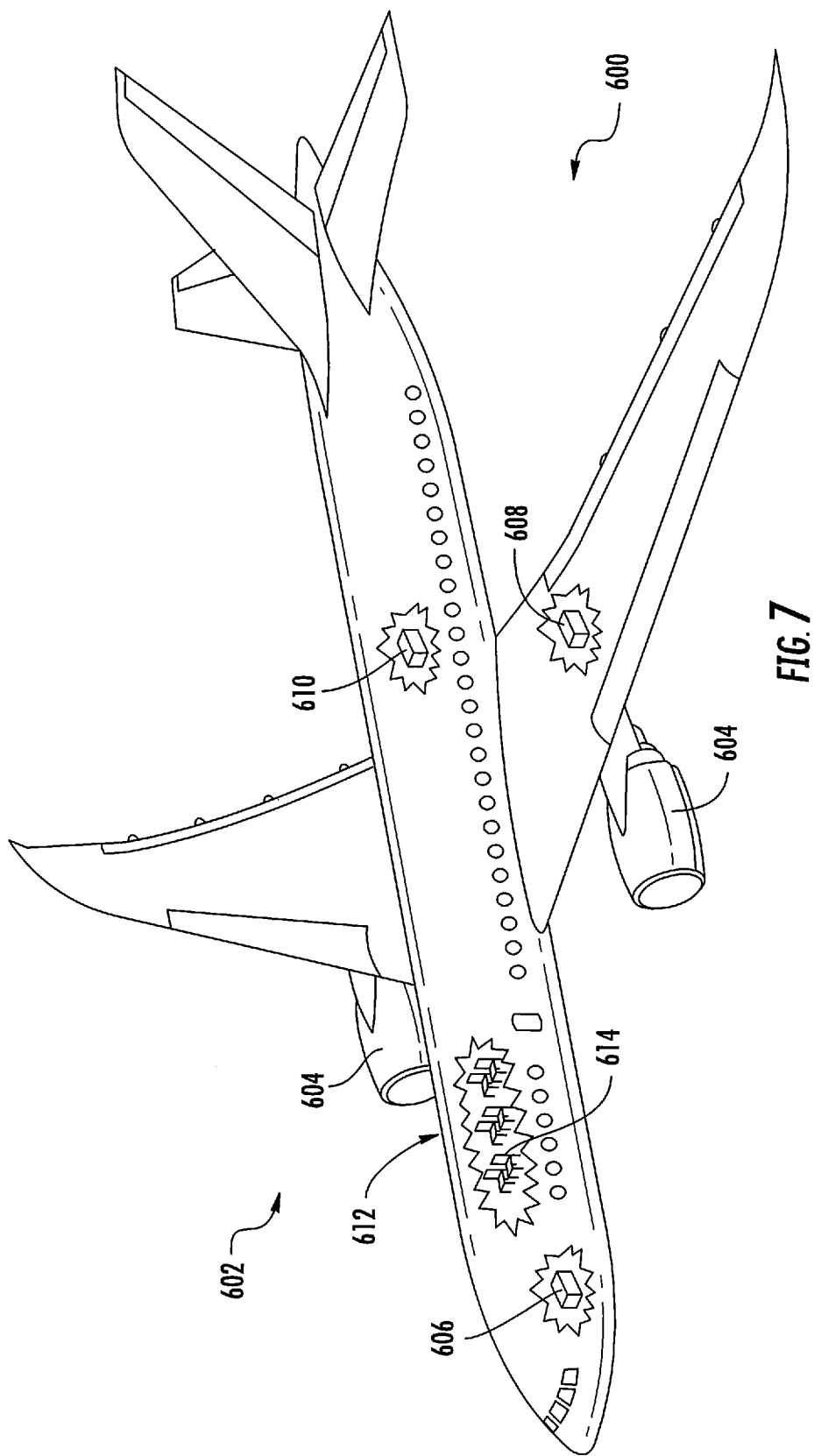
FIG. 7 is a schematic illustration of an aircraft.

As referenced above, examples of the present disclosure may be described in the context of aircraft manufacturing and service. As shown in FIGS. 6 and 7, during preproduction, illustrative method 500 may include specification and design (block 502) of aircraft 602 and material procurement (block 504). During production, component and subassembly manufacturing (block 506) and system integration (block 508) of aircraft 602 may take place. Thereafter, aircraft 602 may go through certification and delivery (block 510) to be placed in service (block 512). While in service, aircraft 602 may be scheduled for routine maintenance and service (block 514). Routine maintenance and service may include modification, reconfiguration, refurbishment, etc. of one or more systems of aircraft 602.

Each of the processes of illustrative method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 7, aircraft 602 produced by illustrative method 500 may include airframe 612 with a plurality of high-level systems 600 and interior 614. Examples of high-level systems 600 include one or more of propulsion system 604, electrical system 606, hydraulic system 608, and environmental system 610. Any number of other systems may be included. Although an aerospace example is shown, the principles disclosed herein may be applied to other industries, such as the automotive industry. Accordingly, in addition to aircraft 602, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 500. For example, components or subassemblies corresponding to component and subassembly manufacturing 506 may be fabricated or manufactured in a manner similar to components or subassemblies produced while aircraft 602 is in service. Also, one or more examples of the apparatus(es), method(s), or combination thereof may be utilized during production stages 506 and 508, for example, by substantially expediting assembly of or reducing the cost of aircraft 602. Similarly, one or more examples of the apparatus or method realizations, or a combination thereof, may be utilized, for example and without limitation, while aircraft 602 is in service, e.g., maintenance and service stage (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for improving security of a device including:
   a counter;
   a first mixing unit that scrambles a first value of the counter; and
   a first block cipher that encrypts the scrambled first value of the counter;
   wherein an output of the first block cipher is XORed to a first plaintext message to obtain a first ciphertext message; and
   wherein the first mixing unit is selected from the group consisting of a XOR tree mixing unit, substitution-permutation mixing unit, and double-mix Feistel mixing unit.

2. The system of claim 1 wherein the counter is initialized by a nonce.

3. The system of claim 2 wherein the nonce is selected from the group consisting of a sequence number, real-time clock value, or random number.

4. The system of claim 3 wherein the first mixing unit maps bit input of the nonce's block size with bit output of the nonce's block size.

5. The system of claim 1 wherein the first mixing unit is invertible.

6. The system of claim 1 wherein the first mixing unit is non-linear.

7. The system of claim 1 wherein the first block cipher is a Federal Information Processing Standard approved Advanced Encryption Standard cipher.

8. The system of claim 1 further including:
   a second mixing unit that scrambles a second value of the counter; and
   a second block cipher that encrypts the scrambled second value of the counter;
   wherein an output of the second block cipher is XORed to a second plaintext message to obtain a second ciphertext message.

9. The system of claim 8 wherein the system is parallelizable such that the second ciphertext message can be generated without using the first ciphertext message.

10. The system of claim 8 wherein an identical key is used for first block cipher and the second block cipher.

11. The system of claim 8 wherein the scrambled first counter value has no statistical correlation with the scrambled second counter value.

12. A system for improving security of a device including a counter mode encryption engine that:
   receives data;
   applies a block cipher operating in connection with a counter to a segment of the data;
   applies a mixing function to the counter of the block cipher; and
   processes remaining segments of the data with the block cipher while applying the mixing function to the counter for each segment of the data;
   wherein the mixing function is selected from the group consisting of a XOR tree mixing function, substitution-permutation mixing function, and double-mix Feistel mixing function.

13. A method for of claim for improving security of a device including steps of:
   initializing a counter;
   scrambling a first value of the counter with a first mixing unit;
   encrypting the scrambled first value of the counter with a first block cipher; and
   XORing an output of the first block cipher to a first plaintext message to obtain a first ciphertext message;
   wherein the first mixing unit is selected from the group consisting of a XOR tree mixing unit, substitution-permutation mixing unit, and double-mix Feistel mixing unit.

14. The method of claim 13 further including the step of initializing the counter with a nonce that is selected from the group consisting of a sequence number, real-time clock value, or random number.

15. The method of claim 14 further including the step of mapping bit input of the nonce's block size with bit output of the nonce's block size.

16. The method of claim 13 wherein the first mixing unit is invertible.

17. The method of claim 13 wherein the first mixing unit is non-linear.

18. The method of claim 13 wherein the first block cipher is a Federal Information Processing Standard approved Advanced Encryption Standard cipher.

19. The method of claim 13 further including the steps of:
   scrambling a second value of the counter with a second mixing unit;
   encrypting the scrambled second value of the counter with a second block cipher; and
   XORing an output of the second block cipher to a second plaintext message to obtain a second ciphertext message.

20. The method of claim 19 further including the step of generating the second ciphertext message without using the first ciphertext message.

21. The method of claim 19 further including the step of using an identical key for the first block cipher and the second block cipher.

22. The method of claim 19 wherein the scrambled first counter value has no statistical correlation with the scrambled second counter value.

* * * * *